A. O. GIRARD.
STOVE.
APPLICATION FILED FEB. 25, 1911.
1,020,278.
Patented Mar. 12, 1912.
3 SHEETS—SHEET 2.
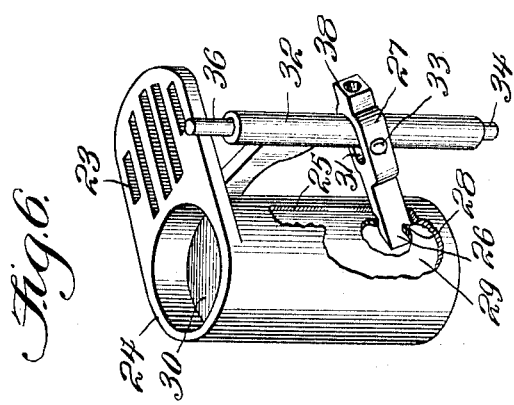
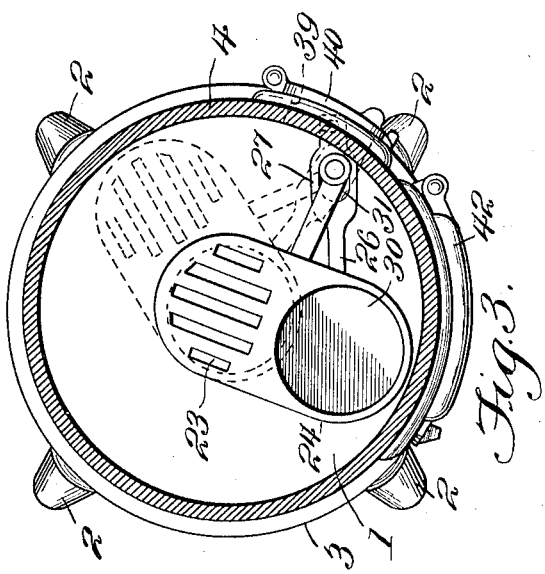

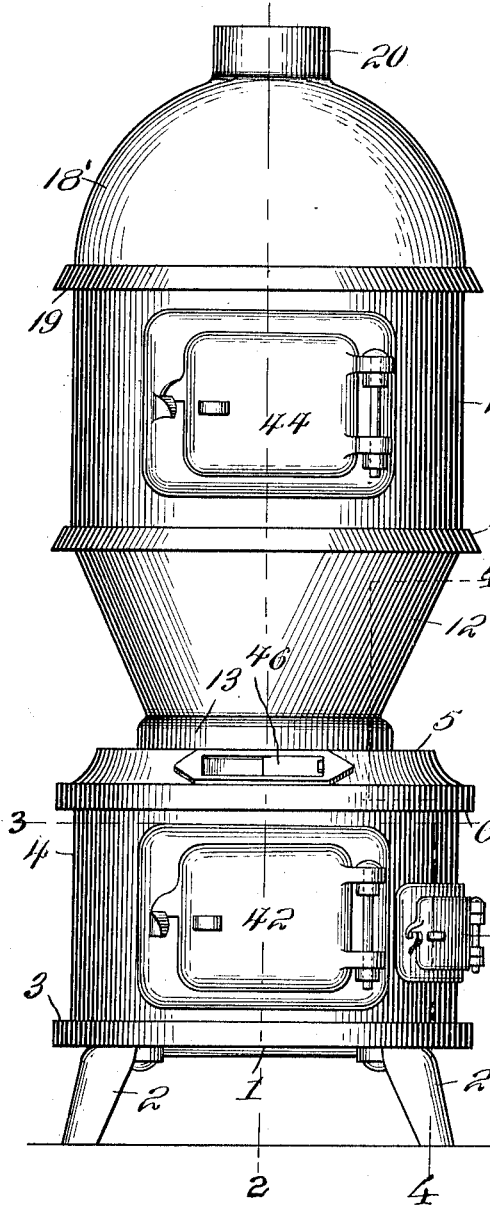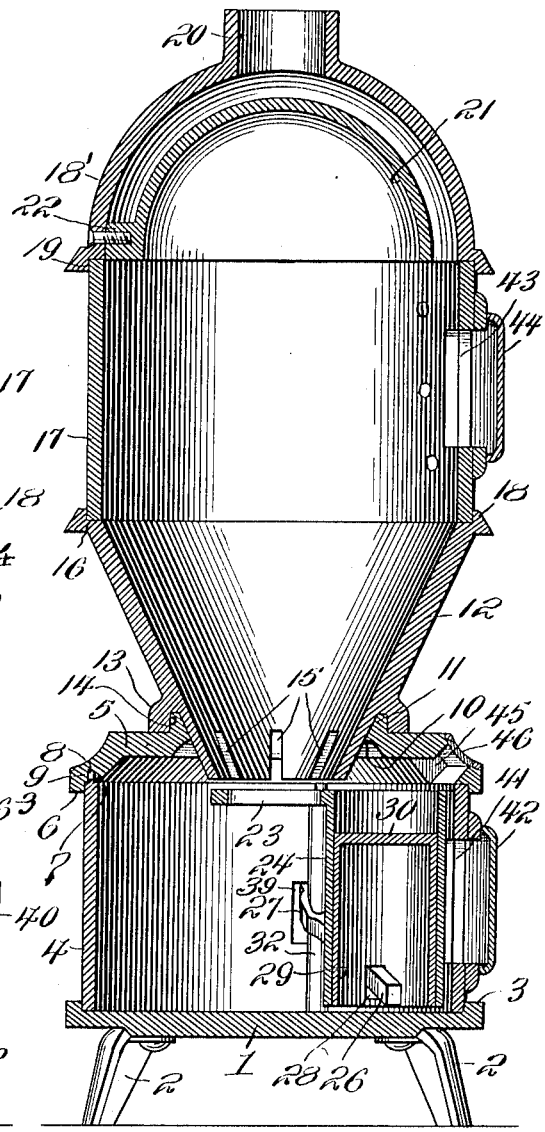

A. O. GIRARD.
STOVE.
APPLICATION FILED FEB. 25, 1911.
1,020,278.
Patented Mar. 12, 1912.
3 SHEETS—SHEET 3.
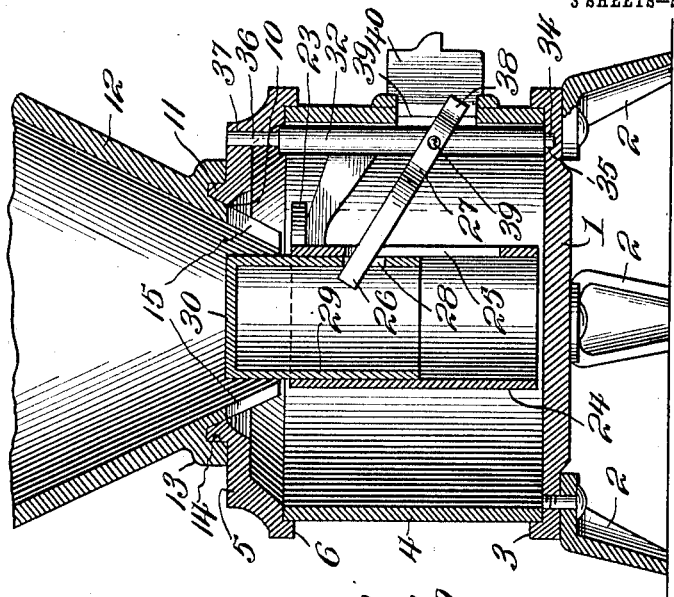
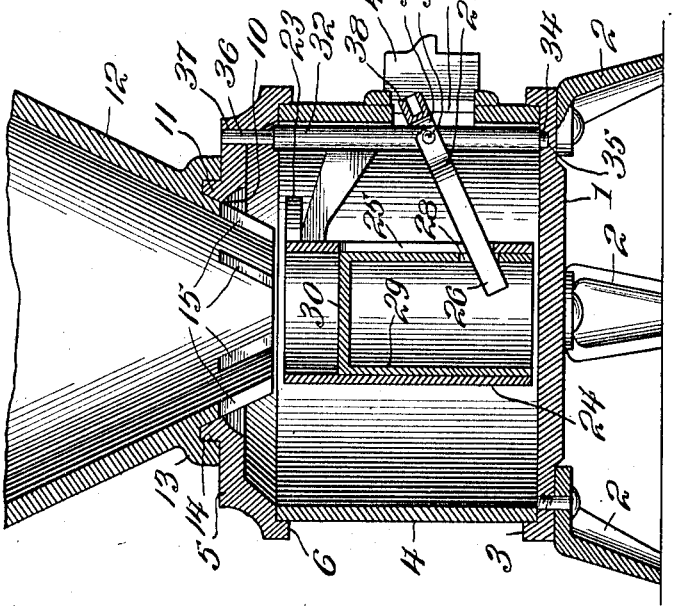
Inventor
Augustus O. Girard
Witnesses
J. T. L. Wright
James A. Koch
By Victor J. Evans,
Attorney

UNITED STATES PATENT OFFICE.

AUGUSTUS O. GIRARD, OF ST. LOUIS, MISSOURI.

STOVE.

1,020,278. Specification of Letters Patent. Patented Mar. 12, 1912.

Application filed February 25, 1911. Serial No. 610,750.

*To all whom it may concern:*

Be it known that I, AUGUSTUS O. GIRARD, a citizen of the United States, residing in the city of St. Louis and State of Missouri, have invented new and useful Improvements in Stoves, of which the following is a specification.

This invention relates to stoves.

An object of the invention is to provide an improved construction of fire-pot and grate, the latter being movably mounted beneath the fire-pot and normally closing the lower end thereof, the lower end of the fire-pot being formed with a series of openings so as to permit of the escape of the ashes on movement of the grate.

Another object of the invention is to provide the grate with a basket which may be operated on movement of the grate to a certain position so that the contents of the fire-pot or a portion thereof can be dumped into the basket.

Another object of the invention is to provide the basket with an agitator or plunger which may be vertically reciprocated so as to agitate the coals and the ashes so as to cause distribution of the ashes through the opening in the bottom of the fire-pot.

Another object of the invention resides in the association of the basket with the grate and the construction of the said plunger or agitator, the latter being normally disposed below the plane of the top of the basket so as to permit the larger coals to be deposited in the basket and afterward placed back into the fire-pot on the required operation of the plunger or agitator.

In the drawings, forming a portion of this specification and in which like numerals of reference indicate similar parts in the several views:—Figure 1 is a side view of the complete stove. Fig. 2 is a section therethrough taken on the line 2—2 of Fig. 1. Fig. 3 is a horizontal section on line 3—3 of Fig. 1, parts being shown in full lines. Fig. 4 is a section on line 4—4 of Fig. 1 showing the fire-pot in operative position on the lower portion of the stove and showing the plunger in a lowered position. Fig. 5 is a similar view showing the plunger in a raised position. Fig. 6 is a perspective view of the combined grate and basket removed from the stove.

My improved stove comprises a base member 1 which is herein shown of a circular configuration, being provided on its underside with a plurality of suitable supporting feet 2. On the upper side the said base member is formed with a continuous circular flange 3 which embraces the lower portion of the section 4 of the stove, any suitable means being employed for the purpose of holding the section 4 to the base member 1. The section 4, and the base member 1, operate collectively to form the usual ash-pit at the bottom of the stove, as is obvious. A cap 5 fits the section 4 of the stove, the said cap being provided with a depending flange 6 which exteriorly embraces the upper end of the section 4. The said cap 5 is provided with a horizontal shoulder 7 which wholly contacts with the upper edge portion of the section 4 and which may be coated with a suitable plastic material to be utilized with means for holding the cap 5 and section 4 together. The upper edge of the section 4 is preferably provided with a vertical stud 8 which fits a correspondingly formed recess 9 in the shoulder 7 of the cap. The cap is formed at its center with an opening 10 which is surrounded by a circular flange 11 extending vertically from the cap and preferably formed integrally therewith. The fire-pot 12 is substantially of frusto-conical construction, having its walls flared upwardly so that the small end of the fire-pot is lowermost. Immediately above the small end of the fire-pot and formed integrally with the fire-pot exteriorly thereof is a circular boss 13 which is constructed on its underside to provide a continuous groove 14 which receives the collar or flange 11 of the cap 5. From this construction it will be observed on reference to Fig. 2 of the drawings that the lower end of the fire-pot extends directly into the ash-pit of the stove, the said lower end being formed to provide a plurality of longitudinally extending discharge passages 15 to be employed for a purpose to be hereinafter described.

The upper end of the fire-pot is formed with a horizontal shoulder 16 on which rests the lower end of a drum 17, the lower end of the drum being embraced by a circular flange 18 located exteriorly upon the large end of the fire-pot adjacent the shoulder 16. The drum 17 is provided with an upper section 18′ having a depending flange 19 fitting over the upper end of the section 17, as illustrated. The section 18' of the drum is hollow and is substantially of hemispherical configuration, being provided at its center and at its upper end with a nipple or flange 20 to which one end of the stove pipe or flue, (not shown), may be attached.

While I have only described that certain of the sections are preferably separated from each other by a plastic substance such as plaster of Paris or the like, it is obvious that all the joints between the sections will be likewise protected.

The opening at the small end of the fire-pot is closed by a horizontally movable grate 23 which forms a part of a vertically disposed basket or receptacle 24. The basket or receptacle is of the same transverse dimension as the grate 23 and it is preferably open at both ends. The receptacle 24 is provided with a vertical slot 25 through which the arm 26 of a rock lever 27 is movable. The inner end of the arm 26 extends through an elongated passage 28 in the vertical walls 29 of a combined agitator and bottom, the same being closed at its upper end by a head 30. The length of the agitator is somewhat less than the length of the receptacle or basket 24 and under the weight of the agitator it is normally arranged in the receptacle or basket with the head portion considerably below the plane of the grate and the open end of the said receptacle. The downward movement of the agitator is limited by the lower wall of the slot 25, the said wall being disposed directly in the path of movement of the arm 26, as shown. The lever 27 is formed with an elongated slot 31 through which the sleeve 32 extends. The sleeve is preferably formed integrally with the grate and it has pivotal connection with the rock lever 27, as at 33. At the lower end, the sleeve 32 is provided with a depending stud 34 which is removably fitted in a recess 35 in the base 1. The upper end of the sleeve is provided with a stud 36 which is fitted in a passage or recess 37 in the cap 5. The outer end of the rock lever 27 is provided with a socket portion 38 which normally extends into the door opening 39 in the section 4 of the stove. The opening 39 is closed by a suitable door 40. From this construction it will be seen that the door 40 may be opened to expose the socket portion of the rock lever 27 and to permit of the engagement therein of any suitable operating tool so that horizontal movement of the tool in the door opening 39 will correspondingly move the grate across the lower end of the fire-pot. Vertical rocking movement of the tool will impart vertical reciprocatory movements to the agitator in the receptacle 24 and when the receptacle is disposed immediately beneath the fire-pot the coals and the ashes will be thoroughly agitated so that the ashes will be discharged from the fire-pot by way of the openings 15 hereinbefore described.

When desired, the grate and receptacle may be moved to a position so as to cause the latter to be disposed directly beneath the fire-pot, and after thorough agitation of the coal and ashes in the fire-pot the plunger or agitator of the receptacle may be lowered so as to permit the unburned coals in the fire-pot to be deposited in the receptacle. The stove is then in a condition to permit of further rocking movement of the grate across the bottom of the fire-pot and after a thorough discharge of the ashes has been made the rock lever 27 can be actuated so as to move the plunger upwardly and to carry the collected unburned coals which have been deposited into the receptacle back to the fire-pot for consumption. It will of course be understood that after this operation the grate and receptacle are adjusted so that the grate will be disposed immediately beneath the bottom of the fire-pot.

By forming the bottom of the fire-pot with the slots 15, I not only allow for the displacement of the ashes from the fire-pot as hereinbefore described, but I provide for the expansion and contraction of the metal and thereby obviate cracking of the fire-pot on the change of temperature.

The base section 4 of the stove is provided with a suitable clean-out opening 41 and a closure 42 therefor. The section 17 of the drum is provided with a similar filling opening 43 and a closure 44. The cap 5 is formed with an opening 45 and a sliding damper 46, the opening being in direct communication with the ash-pit, as shown.

I claim:—

1. A stove including a fire-pot, an ash receptacle located beneath the fire-pot, means supporting the receptacle for movement to permit of its being disposed directly beneath the fire-pot or at one side thereof, a grate carried by the receptacle and closing the lower end of the fire-pot when the receptacle is in one position, and an agitator carried by the receptacle and adapted to either form a bottom therefor or to be extended into the fire-pot when the receptacle is in another position.

2. A stove including a frusto-conical fire-pot, a member movably mounted beneath the fire-pot and provided with an agitator adapted to be extended into the small end of the fire-pot when the movable member is in one position, the said small end of the fire-pot having its walls apertured so as to permit the ashes to be discharged through the apertures when said agitator is extended into the fire-pot, and a grate carried by the member and adapted to be wholly disposed beneath the fire-pot when the movable member is in another position.

3. A stove including a fire-pot having side ash-discharge passages therein, a receptacle adjustably mounted beneath the fire-pot, an agitator adapted to form the bottom of the receptacle when the receptacle is in one position and adapted to be moved vertically in the receptacle and into the fire-pot when the receptacle is in another position to cause the ashes to be discharged through the passages in the sides of the fire-pot, a rocking member supporting the agitator, and movable means supporting the receptacle and also supporting the said rocking member.

4. A stove including a fire-pot, a receptacle mounted for horizontal movement beneath the fire-pot and provided at its upper end with a horizontally disposed grate portion adapted to be extended beneath the lower end of the fire-pot when the receptacle is in one position, an agitator movably mounted in the receptacle, and means supporting the agitator and receptacle respectively and adapted to permit adjustments of the same to agitating and ash-receiving positions respectively.

In testimony whereof I affix my signature in presence of two witnesses.

AUGUSTUS O. GIRARD

Witnesses:
C. F. ROBERTS,
NANINE O. GIRARD.